(12) United States Patent
Pfeifer et al.

(10) Patent No.: US 10,184,559 B2
(45) Date of Patent: Jan. 22, 2019

(54) DEVICE AND METHOD FOR SELECTING AN OPERATING MODE OF A TRANSMISSION OF A VEHICLE AND SYSTEM FOR SETTING AN OPERATING MODE OF A TRANSMISSION OF A VEHICLE

(71) Applicants: ZF Friedrichshafen AG, Friedrichshafen (DE); Lemförder Electronic GMBH, Espelkamp (DE)

(72) Inventors: Ralf Pfeifer, Diepholz (DE); Andreas Peukert, Barnstorf (DE)

(73) Assignees: ZF Friedrichshafen AG, Friedrichshafen (DE); Lemförder Electronic GmbH, Espelkamp (DE)

(*) Notice: Subject to any disclaimer, the term of this patent is extended or adjusted under 35 U.S.C. 154(b) by 447 days.

(21) Appl. No.: 15/033,418

(22) PCT Filed: Sep. 26, 2014

(86) PCT No.: PCT/EP2014/070597
§ 371 (c)(1),
(2) Date: Apr. 29, 2016

(87) PCT Pub. No.: WO2015/062794
PCT Pub. Date: May 7, 2015

(65) Prior Publication Data
US 2016/0252177 A1    Sep. 1, 2016

(30) Foreign Application Priority Data
Oct. 31, 2013   (DE) .................. 10 2013 222 203

(51) Int. Cl.
*F16H 59/12*   (2006.01)
*F16H 61/02*   (2006.01)
(Continued)

(52) U.S. Cl.
CPC ......... *F16H 61/0204* (2013.01); *F16H 59/12* (2013.01); *F16H 59/54* (2013.01);
(Continued)

(58) Field of Classification Search
CPC ...... F16H 61/0204; F16H 59/12; F16H 59/54; F16H 61/18
See application file for complete search history.

(56) References Cited

U.S. PATENT DOCUMENTS 5,566,778 A * 10/1996 Valier .................. B60K 20/02
                                                     180/334
5,827,149 A * 10/1998 Sponable ............ F16H 63/3466
                                                      477/92
(Continued)

FOREIGN PATENT DOCUMENTS

DE    10208387 A1   10/2002
DE    10212777 A1   10/2003
(Continued)

OTHER PUBLICATIONS

German Office Action dated Jul. 23, 2014 for German Patent Application No. DE 10 2013 222 203.3 (German language), 7 pages.

(Continued)

*Primary Examiner* — David M Fenstermacher
(74) *Attorney, Agent, or Firm* — Brinks Gilson & Lione

(57) ABSTRACT

A device for selecting an operating mode of a transmission of a vehicle is presented. The device has a control panel thereby, having at least one selector switch for selecting an operating mode, and one release switch for enabling a function of the at least one selector switch. The release switch has a touch sensitive button, serving as a first interface to a sensor circuit for enabling the function of the at least one selector switch. The sensor circuit has a second (Continued)

interface on an actuator for a driving function of the vehicle thereby. The sensor circuit can be closed by producing an electrically conductive connection between the first interface and the second interface via a driver region of an interior space of the vehicle.

20 Claims, 1 Drawing Sheet

(51) Int. Cl.
F16H 61/18 (2006.01)
F16H 59/54 (2006.01)
G05G 1/04 (2006.01)
G05G 5/00 (2006.01)

(52) U.S. Cl.
CPC ............... *F16H 61/18* (2013.01); *G05G 1/04* (2013.01); *G05G 5/005* (2013.01)

(56) References Cited

U.S. PATENT DOCUMENTS

| | | | | |
|---|---|---|---|---|
| 6,151,977 A * | 11/2000 | Menig | ................ | B60K 20/06 74/336 R |
| 7,761,254 B2 * | 7/2010 | Fouts | ................ | G01D 5/145 324/207.14 |
| 8,145,399 B2 * | 3/2012 | Lindgren | ............ | F16H 59/0204 701/64 |
| 8,779,904 B2 * | 7/2014 | Yu | ................ | G05B 11/01 340/12.22 |
| 9,904,459 B2 * | 2/2018 | Lin | ............ | G06F 3/0488 |
| 10,067,604 B2 * | 9/2018 | Bytheway | ............ | A63F 13/218 |
| 2004/0226801 A1 * | 11/2004 | De Jonge | ............ | F16H 59/0204 192/220.7 |
| 2005/0273218 A1 * | 12/2005 | Breed | ................ | B60C 11/24 701/2 |
| 2008/0121066 A1 * | 5/2008 | Takebayashi | .......... | B62K 23/06 74/502.2 |
| 2008/0216594 A1 * | 9/2008 | Strait | ................ | F16H 59/0204 74/473.12 |
| 2013/0100021 A1 | 4/2013 | Larsen et al. | | |
| 2015/0308566 A1 * | 10/2015 | Bialas | ................ | F16H 59/12 74/473.12 |
| 2016/0252177 A1 * | 9/2016 | Pfeifer | ................ | F16H 59/12 74/473.12 |

FOREIGN PATENT DOCUMENTS

| | | |
|---|---|---|
| DE | 102009031649 A1 | 1/2011 |
| DE | 102011089980 A1 | 6/2013 |
| DE | 102012223505 A1 | 6/2014 |
| EP | 2017688 A2 | 1/2009 |

OTHER PUBLICATIONS

English translation of p. 7 of German Office Action dated Jul. 23, 2014 for German Patent Application No. DE 10 2013 222 203.3 (2 pages).

International Search Report and Written Opinion dated Aug. 12, 2015 for PCT/EP2014/070597 (German language, 8 pages).

International Search Report dated Aug. 12, 2015 for PCT/EP2014/070597 (English language, 3 pages).

* cited by examiner

DEVICE AND METHOD FOR SELECTING AN OPERATING MODE OF A TRANSMISSION OF A VEHICLE AND SYSTEM FOR SETTING AN OPERATING MODE OF A TRANSMISSION OF A VEHICLE

RELATED APPLICATIONS

This application is a filing under 35 U.S.C. § 371 of International Patent Application PCT/EP2014/070597, filed on Sep. 26, 2014, and claims the priority of German Patent Application DE 10 2013 222 203.3, filed Oct. 31, 2013, both of which are incorporated by reference herein in their entirety.

BACKGROUND

1. Technical Field

The present invention relates to a device for selecting an operating mode of a transmission of a vehicle, a system for setting an operating mode of a transmission of a vehicle, and a method for selecting an operating mode of a transmission of a vehicle.

2. Background Information

Push buttons designed as a shifting device for shifting vehicle transmissions, in particular automatic transmissions, are being used increasingly. For safety reasons, an enabling of a selection action, in particular, is to be provided for, as with a gearshift lever of an automatic transmission.

DE 10 2006 019 065 A1 discloses an input interface for a vehicle cockpit for generating control signals, having a gearshift lever, wherein the gearshift lever has a knob, which forms a finger rest, wherein the gearshift lever is distinguished in that a detection device is provided therein for generating an output signal according to the position of a finger on the finger rest.

BRIEF SUMMARY

With this background, the present invention creates an improved device for selecting an operating mode of a transmission of a vehicle, an improved system for setting an operating mode of a transmission of a vehicle, and an improved method for selecting an operating mode of a transmission of a vehicle, in accordance with the independent Claims. Advantageous designs can be derived from the dependent Claims and the following description.

According to embodiments of the present invention, a touch sensitive push button, in particular, can be used advantageously for a release button for selecting an operating mode, e.g. a gear setting, of a transmission of a vehicle. The fundamental principle of such a touch sensitive push button can, for example, be based on a sensor switch, with which a sensor circuit for a shifting function is provided. The sensor circuit may be designed thereby with an open section between the push button and an actuator in the interior of the vehicle, wherein the sensor circuit can be closed by bypassing the open section by means of an action executed by a vehicle driver, in order to release, or to enable, the selection of the operating mode of the transmission.

Advantageously, in accordance with embodiments of the present invention, an unintentional or accidental selection of an operating mode of a transmission of a vehicle can be prevented, in that a reliable securing and enabling, countering this possibility, is provided. Thus, an operating safety, or driving safety can be increased in a simple manner. The concept for securing and enabling presented herein is safe, intuitive and secure.

The present invention relates to a device for selecting an operating mode of a transmission of a vehicle, wherein the device has a control panel with at least one selector switch for selecting an operating mode, and one release switch for enabling a function of the at least one selector switch, characterized in that the release switch has a touch sensitive push button as a first interface to a sensor circuit, for enabling the function of the at least one selector switch, wherein the sensor circuit has second interface on an actuator for a driving function of the vehicle, wherein the sensor circuit can be closed by producing an electrically conductive connection between the first interface and the second interface via a driver region of an interior of the vehicle.

The vehicle can be a motor vehicle, e.g. motor vehicle intended for road traffic, such as a passenger car or a truck. The device can be a push button device for selecting a drive position, or gear setting of a motor vehicle transmission, in particular an automatic transmission. With the touch sensitive push button, a supply voltage can be measured against a reference potential or ground potential of the vehicle. As long as the interfaces of the sensor circuit are not touched, no current, or very little current, flows at full voltage. When both interfaces are touched by a person, a small current can flow through the person to the ground, wherein the voltage drops. A current flow, or voltage drop, of this type can be detected by the device, and an enabling, or release, signal for enabling the function of the at least one selector switch can be implemented. The sensor circuit can be designed to be closed by a person touching both interfaces, in particular a driver of the vehicle. For this, a weak electrical current can flow through the body of the person, or driver of the vehicle, in order to enable the closing of the circuit. The second interface can be designed as an electrode, or a capacitive or inductive transmitting mechanism, for conducting an electrical current between the sensor circuit and the body of the person.

Thus, the first interface and the second interface can be designed to close the sensor circuit when a driver of the vehicle touches both the first interface and the second interface.

According to one embodiment, the device can have an electrical gearshift, having a detection device for detecting an electrical current in the sensor circuit. The electrical gearshift can be designed thereby, to enable the function of the at least one selector switch, depending on the detected current in the sensor circuit. The electrical gearshift can be designed as a logic circuit, logic mechanism, or suchlike. An embodiment of this type offers the advantage that, based on the detection of the electrical current, an enabling of the selector switch can be implemented in a particularly simple and secure manner.

The electrical gearshift can be designed thereby, to enable the function of the at least one selector switch, when an electrical current is detected in the sensor circuit by the detection device when the sensor circuit is closed. The detection device can be designed to enable the function of the at least one selector switch when and electrical current, representing a closed sensor circuit, is detected in the sensor circuit by means of the detection device. An embodiment of this type offers the advantage that, using the detected electrical current, an enabling of the selector switch can occur in a particularly reliable manner.

It is also advantageous when the actuator is an actuator for a driving brake of the vehicle. The actuator for the driving brake can be a brake pedal or suchlike thereby. An embodiment of this type offers the advantage that the push button shift can only be activated by the driver, because only he can close the sensor circuit between the brake pedal, or brake actuator, respectively, and the push button shift. Fundamentally, the sensor circuit can be closed, for example, via every point in the vehicle that can be reached by a driver, but in any case, the driver will step on the brake pedal, or actuate the driving brake, in order to shift.

Moreover, another sensor circuit may be provided for enabling the function of the at least one selector switch. The release switch, thereby, can represent a first interface of the additional sensor circuit, wherein each further sensor circuit can have a second interface on an actuator for an engine output of the vehicle. The further sensor circuit can be closed thereby, by producing an electrically conductive connection between the first interface and the second interface, via a driver region of an interior space of the vehicle. The actuator for an engine output can be a gas pedal or suchlike. The electrical gearshift and the detection device can be connected to the further sensor circuit. The electrical gearshift and the detection device can be designed to monitor an electrical current flow in the sensor circuit, as a function of a temporal sequence of a detected, electrical current in the sensor circuit and to enable the function of the at least one selector switch in the further sensor circuit. An embodiment of this type offers the advantage that, for certain situations, such as a rocking of a vehicle that is stuck, a second operating element, in particular the gas pedal or a similar mechanism, can be used. As a result, the executing of a change in the operating mode of the vehicle transmission can be made more flexible, while maintaining the security against an accidental shifting, in order to also be appropriate for use in exceptional driving situations.

According to one embodiment, the electrical gearshift can be designed to enable the function of the at least one selector switch, depending on a type of an operating mode that can be selected by the at least one selector switch. The electrical gearshift can be designed thereby, to enable the function of the at least one selector switch, depending on, or independently of, an electrical current in the sensor circuit. In particular, the electrical gearshift can be designed to enable the function of the at least one selector switch, depending on a property of the operating mode selected, by the at least one selector switch, and/or to enable the function of the at least one selector switch, depending on a currently present operating mode. An embodiment of this type offers the advantage that, in definable situations, certain gear selections may be permitted, without the sensor system reporting a closed sensor circuit. For some gear selections, it may also be permitted, thereby, that in order to select the operating mode, only one pressing of a button of a selector switch is required, without, for example, having to actuate the brake.

Furthermore, the device can have a movement sensor for enabling the function of the at least one selector switch on an actuator for a driving brake of the vehicle. The movement sensor can have or represent a brake light switch. The movement sensor can be designed thereby, to detect a movement of the actuator for the driving brake of the vehicle. Thus, the movement sensor can be designed to enable the function of the at least one selector switch, when the actuator for the driving brake is in an actuated state. The movement sensor can have or represent a brake light switch. The brake light switch can provide, thereby, a signal for a light control of the brake light when the actuator for the driving brake is in the actuated state. An enabling by means of the movement sensor can result, additionally or alternatively, in an enabling by means of the sensor circuit. An embodiment of this type offers the advantage that a further variation of a safeguard against unintentional gear selection can be integrated and implemented.

The present invention also relates to a system for setting an operating mode of a transmission of a vehicle, wherein the system has a device for selecting an operating mode of the transmission and a device for controlling the transmission, characterized in that the device for selecting is an embodiment of the device for selecting specified above, wherein the device for controlling is designed in order to control the setting of the operating mode of the transmission as a function of an operating mode selected by means of the device for selecting.

An embodiment of the device specified above for selecting an operating mode of a transmission can be advantageously implemented or used in conjunction with the system for setting an operating mode of a transmission of a vehicle. The device for controlling the transmission can be a transmission control device. An embodiment of the system specified above can be advantageously implemented or used in order to set an operating mode of a transmission of a vehicle.

The present invention also relates to a method for selecting an operating mode of a transmission of a vehicle, wherein the method is executed in conjunction with a device for selecting an operating mode of the transmission, wherein the device has a control panel having at least one selector switch for selecting an operating mode and a release switch, for enabling a function of the at least one selector switch, wherein the method has the following steps: reading in of a release signal from the release switch, wherein the release switch has a touch sensitive push button as an interface to a sensor circuit for enabling the function of the at least one selector switch, wherein the sensor circuit has a second interface on an actuator for a driving function of the vehicle, wherein the sensor circuit can be closed by producing an electrically conductive connection between the first interface and the second interface via a driver region of an interior space of the vehicle; and generation of a selection signal, representing a selected operating mode of the transmission, depending on the release signal and an actuation signal from the at least one selector switch.

The method can be advantageously executed in conjunction with an embodiment of the device specified above for selection, and/or the system specified above for setting, in order to select an operating mode of a transmission of a vehicle. The release signal can be read in by the release switch, or provided by it, when the sensor circuit is closed, or is detected as closed.

BRIEF DESCRIPTION OF THE DRAWINGS

The invention shall be explained in greater detail, by way of example, based on the attached drawings. Therein.

DETAILED DESCRIPTION OF THE DRAWINGS AND THE PRESENTLY PREFERRED EMBODIMENTS

In the following description of preferred exemplary embodiments of the present invention, identical or similar reference symbols shall be used for the elements depicted in the various figures having similar functions, wherein a description of these elements shall not be repeated.

Figure 1:
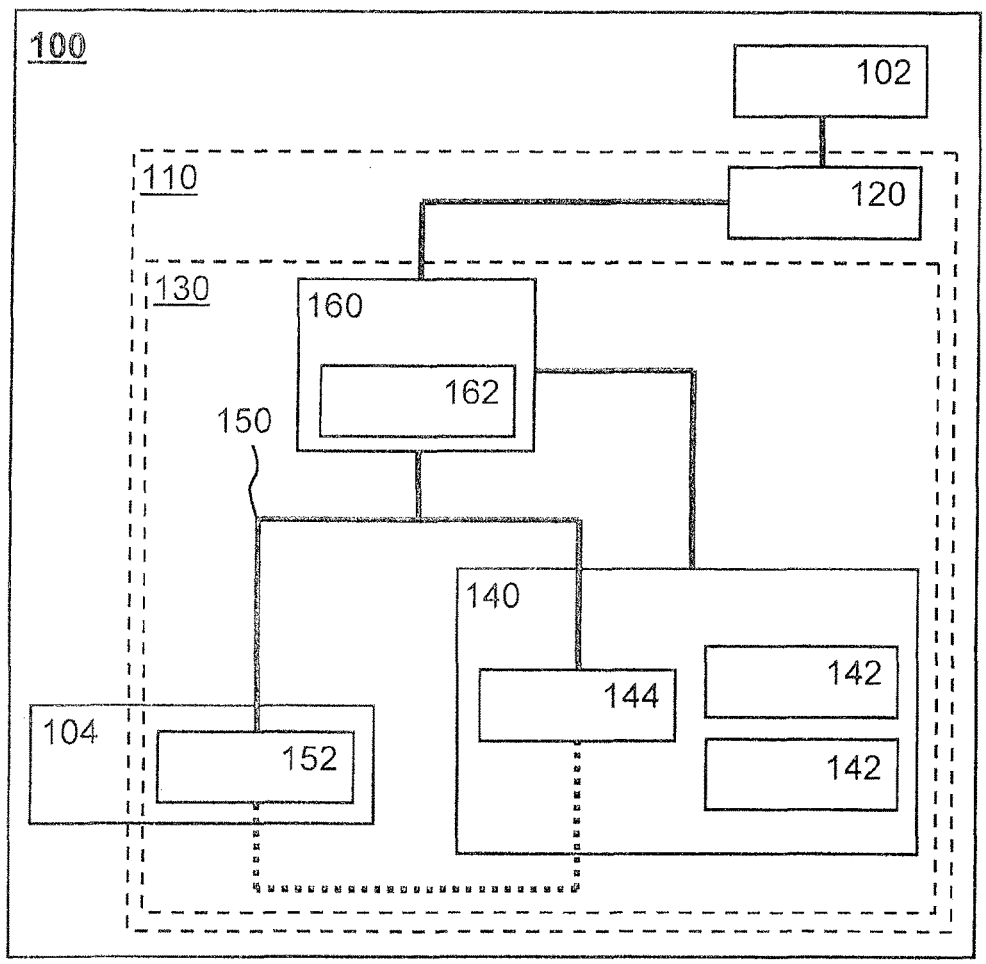
FIG. 1 shows a schematic depiction of a vehicle having a system for setting an operating mode of a transmission of a vehicle in accordance with an exemplary embodiment of the present invention.

FIG. 1 shows a schematic depiction of a vehicle having a system for setting an operating mode of a transmission of a vehicle in accordance with an exemplary embodiment of the present invention. Thereby, a transmission 102, an actuator 104 for a driving function, the system 110 for setting the operating mode, a control device 120, or device for controlling the transmission, respectively, a selection device 130, or device for selecting the operating mode, respectively, a control panel 140, merely by way of example, having two selector switches 142, and a release switch 144, a sensor circuit 150, an electrode 152, an electrical gearshift 160, or logical system, respectively, and a detection device 162, or a current measuring device, or an ampere meter, respectively, of the vehicle 100 are shown therein.

The vehicle 100 is a motor vehicle, e.g. a passenger car, truck, or utility vehicle. The vehicle 100 has the transmission 102, the actuator 104 and the system 110. The transmission 102 is an automatic transmission, in accordance with the exemplary embodiment of the present invention depicted in FIG. 1. In accordance with the exemplary embodiment depicted in FIG. 1, the actuator 104 is an actuator for a driving brake of the vehicle 100. The actuator 104 for the driving function thus represents, e.g., a brake pedal of the vehicle 100.

The system 110 for setting an operating mode of the transmission 102 of the vehicle 100 has the control device 120, which can also be referred to as a transmission control device, and the selection device 130. The control device 120 is connected to the transmission 02 such that it is capable of transmitting a signal. The control device 120 is designed to control the transmission 102, in order to set the operating mode of the transmission, depending on an operating mode selected by means of the selection device 130. The selection device 30 is connected to the control device 120 such that it is capable of transmitting a signal. The selection device 130 has the control panel 140, the sensor circuit 150, and the electrical gearshift 160.

The control panel 140 of the selection device 130 has the exemplary two selector switches 142 and the release switch 144. The selector switches 142 are designed for selecting the operating mode of the transmission 102. The control panel 140 can have one selector switch 142, or more than two selector switches 142, in accordance with another exemplary embodiment. The release switch 144 is designed to enable a function of the selector switch 142. When the release switch 144 is actuated, the function of the selector switch 142 is enabled. The release switch 144 is designed as a touch sensitive button.

The sensor circuit 150 has the release switch 144 as a first interface, and the electrode 152 as a second interface. The electrode 152 is disposed on the actuator 104. The sensor circuit 150 is provided for enabling the function of the selector switch 142. The release switch 144 and the electrode 152 are connected in series to one another in the sensor circuit 150 thereby. The sensor circuit 150 can be closed by producing an electrically conductive connection between the first interface, i.e. the release switch 144, and the second interface, i.e. the electrode 152, via a driver region of an interior space of the vehicle 100. The sensor circuit 150 can be galvanically closed thereby, by means of a body, in particular a driver of the vehicle 100, when the driver touches both the release switch 144 as well as the electrode 152. When the sensor circuit 150 is closed, the function of the selector switch 142 is enabled, or can be enabled. The closeable section of the sensor circuit 150 is illustrated in FIG. 1, symbolically, by means of a broken line.

The electrical gearshift 160 has the detection device 162. The detection device 162 is designed thereby, to detect an electrical current, or an electrical current flow, respectively, in the sensor circuit 150. The electrical gearshift 160 is designed thereby, to enable the function of the selector switch 142, depending on the detected current in the sensor circuit 150. For this, the electrical gearshift 160 is connected to the sensor circuit 150 such that it is capable of transmitting a signal. Furthermore, the electrical gearshift 160 is connected to the control panel 140 such that it is capable of transmitting a signal. The electrical gearshift 160 is also connected to the control device 120 such that it is capable of transmitting a signal. Precisely stated, the electrical gearshift 160 is designed to enable the function of the selector switch 142, when an electrical current is detected in the sensor circuit 150, when the sensor circuit 150 is closed.

According to one exemplary embodiment, the selector switch 130 has another sensor circuit for enabling the function of the selector switch 142. The release switch represents a first interface of the other sensor circuit thereby. The other sensor circuit has a second interface on an actuator for an engine output of the vehicle 100, i.e. on a gas pedal, for example. The other sensor circuit can also be closed by producing an electrically conductive connection between the first interface and the second interface via the driver region of the interior space of the vehicle 100.

According to one exemplary embodiment, the electrical gearshift 160 is designed to enable the function of the selector switch 142, depending on a type of operating mode that can be selected by the selector switch 142. According to one exemplary embodiment, the selection device 130 has a movement sensor for enabling the function of the selector switch 142 on an actuator for a driving brake, or a brake pedal, respectively, of the vehicle 100.

For the selection device 130 having at least one push button, or the device for selecting an operating mode of the transmission 102 of the vehicle 100, respectively, the sensor circuit 150 according to an exemplary embodiment of the present invention is constructed between the actuator 104, or the brake pedal, respectively, and the release switch 144 of the button gearshift, or the operating panel 140, respectively. When, for example, a driver steps on the brake pedal, i.e., actuates the actuator, a brake light switch signals the actuation to the system 110, such that a first safeguard against an unintentional gear shifting can be deactivated. The driver then closes the sensor circuit 150, for example, via his foot on the electrode 152 on the actuator 104, as well as by pressing the release button 144 on the control panel 140, or the push button, such that the sensor circuit 150 is fully closed by the driver, by means of which a second safeguard against an unintentional gear shifting is deactivated. By pressing a selector switch 142 on the control panel 140, or a push button, respectively, a gear setting, or operating mode, can then be selected.

For a selection device 130, or a gearshift for a vehicle 100, which enables the selection of a suitable transmission ratio, or a gear, or a driving program having an automatic transmission ratio adjustment, or driving position, via buttons, it is thus provided herein that a current flow to the release button 144 is detected. A current flow occurs thereby from/to the release button 144 via the electrode 152 on the actuator 104, as well as via another operating element of the vehicle 100. The driver produces the current flow by simultaneously touching the release button 144 and a second interface, or the electrode 152 on the actuator 104, wherein the current flow in the sensor circuit 150 is detected or measured by means of the detection device 162. The electrical gearshift 160 is designed thereby, to give the current flow a meaning. The selection device 130 is designed thereby, to issue the enabling of the control device 120, and thus the transmission 102 as well, for receiving the implementation, or the driver's intention represented by the pushing of the button. The second interface of the sensor circuit 150 is disposed thereby, merely by way of example, on the actuator 104 for the driving brake, e.g. on a foot brake pedal, or, in vehicles for handicapped drivers, on another device.

Figure 2:
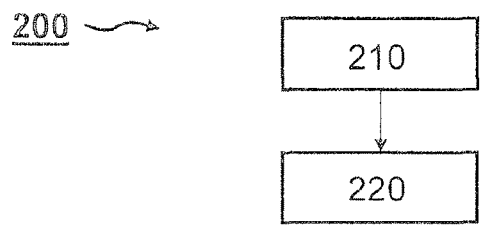
FIG. 2 shows a flow chart for a method for selecting an operating mode of a transmission of a vehicle, in accordance with an exemplary embodiment of the present invention.

FIG. 2 shows a flow chart for a method 200 for selecting an operating mode of a transmission of a vehicle, in accordance with an exemplary embodiment of the present invention. The method 200 can be executed thereby in conjunction with a device for selecting an operating mode of the transmission. The device has a control panel thereby, having at least one selector switch for selecting an operating mode, and a release switch for enabling a function of the at least one selector switch. In particular, the method 200 can advantageously be executed in conjunction with the system, or the device for selecting from FIG. 1.

The method 200 has a step 210 for reading in a release signal from the release switch. The release switch has a touch sensitive button thereby, functioning as a first interface to a sensor circuit for enabling the function of the at least one selector switch, wherein the sensor circuit has a second interface on an actuator for a driving function of the vehicle. The sensor circuit can be closed thereby, by producing an electrically conductive connection between the first interface and the second interface via a driver region of an interior space of the vehicle.

The release signal is read in by the release switch 144, or provided by the release switch 144, thereby, when the sensor circuit 150 is closed, or is detected as closed by the detection device 162 and/or the electrical gearshift 160.

The method 200 furthermore has a step 220 for generating a selection signal, representing a selected operating mode of the transmission, depending on the release signal and an actuation signal from the at least one selector switch.

The exemplary embodiments described herein and shown in the figures are selected only by way of example. Different exemplary embodiments can be combined with one another, either entirely, or with respect to individual features. Furthermore, an exemplary embodiment can be supplemented by features of another exemplary embodiment. Moreover, method steps according to the invention can be repeated, as well as executed in a sequence differing from that described herein.

If an exemplary embodiment comprises an "and/or" conjunction between a first feature and a second feature, this can be read to mean that the exemplary embodiment exhibits both the first feature and the second feature according to one embodiment, and exhibits either only the first feature or only the second feature according to another embodiment.

REFERENCE SYMBOLS 100 vehicle
102 transmission
104 actuator
110 system for setting
120 device for control
130 device for selecting
140 control panel
142 selector switch
144 release switch
150 sensor circuit
160 electrical gearshift
162 detection device
200 method for selecting
210 step for reading in
220 step for generation

What is claimed is:

1. A device for selecting an operating mode of a transmission of a vehicle, the device comprising:
   a control panel comprising at least one selector switch for selecting an operating mode; and
   a release switch for enabling a function of the at least one selector switch;
   wherein the release switch has a touch sensitive button as an interface to a sensor circuit for enabling the function of the at least one selector switch;
   wherein the sensor circuit has a second interface on an actuator for a driving function of the vehicle; and
   wherein the sensor circuit can be closed by producing an electrically conductive connection between the first interface and the second interface via a driver region of an interior space of the vehicle.

2. The device of claim 1, wherein the first interface and the second interface are designed to close the sensor circuit via the driver of the vehicle when the driver of the vehicle touches the first interface and the second interface.

3. The device of claim 2, wherein the device further comprises an electrical gearshift having a detection device for detecting an electrical current in the sensor circuit, wherein the electrical gearshift is designed to enable the function of the at least one selector switch, depending on the detected current in the sensor circuit.

4. The device of claim 3, wherein the electrical gearshift is designed to enable the function of the at least one selector switch when an electrical current is detected in the sensor circuit by the detection device when the sensor circuit is closed.

5. The device of claim 4, wherein the electrical gearshift is designed to enable the function of the at least one selector switch depending on a type of an operating mode that can be selected by the at least one selector switch.

6. The device of claim 2, wherein the actuator is an actuator for a driving brake of the vehicle.

7. The device of claim 2, the device further comprising a further sensor circuit for enabling the function of the at least one selector switch, wherein the release switch represents a first interface of the further sensor circuit, wherein the further sensor circuit has a second interface on an actuator for an engine output of the vehicle, wherein the further sensor circuit can be closed by producing an electrically conductive connection between the first interface and the second interface via a driver region of an interior space of the vehicle.

8. The device of claim 2, wherein the device further comprises a movement sensor for enabling the function of the at least one selector switch on an actuator for a driving brake of the vehicle.

9. The device of claim 1, wherein the device further comprises an electrical gearshift having a detection device for detecting an electrical current in the sensor circuit, wherein the electrical gearshift is designed to enable the function of the at least one selector switch, depending on the detected current in the sensor circuit.

10. The device of claim 9, wherein the device further comprises a movement sensor for enabling the function of the at least one selector switch on an actuator for a driving brake of the vehicle.

11. The device of claim 9, wherein the actuator is an actuator for a driving brake of the vehicle.

12. The device of claim 9, wherein the electrical gearshift is designed to enable the function of the at least one selector switch when an electrical current is detected in the sensor circuit by the detection device when the sensor circuit is closed.

13. The device of claim 12, wherein the actuator is an actuator for a driving brake of the vehicle.

14. The device of claim 12, wherein the electrical gearshift is designed to enable the function of the at least one selector switch, depending on a type of an operating mode that can be selected by the at least one selector switch.

15. The device of claim 1, wherein the actuator is an actuator for a driving brake of the vehicle.

16. The device of claim 15, wherein the device further comprises a movement sensor for enabling the function of the at least one selector switch on an actuator for a driving brake of the vehicle.

17. The device of claim 1, the device further comprising a further sensor circuit for enabling the function of the at least one selector switch, wherein the release switch represents a first interface of the further sensor circuit, wherein the further sensor circuit has a second interface on an actuator for an engine output of the vehicle, wherein the further sensor circuit can be closed by producing an electrically conductive connection between the first interface and the second interface via a driver region of an interior space of the vehicle.

18. The device of claim 1, wherein the device further comprises a movement sensor for enabling the function of the at least one selector switch on an actuator for a driving brake of the vehicle.

19. A system for setting an operating mode of a transmission of a vehicle, the system comprising:
a device for selecting an operating mode of the transmission; and
a device for controlling the transmission;
wherein the device for controlling is designed for setting the operating mode of the transmission, depending on an operating mode selected via the device for selecting; and
wherein the device for selecting comprises:
a control panel comprising at least one selector switch for selecting an operating mode; and
a release switch for enabling a function of the at least one selector switch:
wherein the release switch has a touch sensitive button as an interface to a sensor circuit for enabling the function of the at least one selector switch;
wherein the sensor circuit has a second interface on an actuator for a driving function of the vehicle; and
wherein the sensor circuit can be closed by producing an electrically conductive connection between the first interface and the second interface via a driver region of an interior space of the vehicle.

20. A method for selecting an operating mode of a transmission of a vehicle, wherein the method is executed in conjunction with a device for selecting an operating mode of the transmission, wherein the device has at least one selector switch for selecting an operating mode, and one release switch for enabling a function of the at least one selector switch, the method comprising:
reading in of a release signal from the release switch, wherein the release switch has a touch sensitive button as a first interface to a sensor circuit for enabling the function of the at least one selector switch, wherein the sensor circuit has a second interface on an actuator for a driving function of the vehicle, wherein the sensor circuit can be closed by producing an electrically conductive connection between the first interface and the second interface via a driver region of an interior space of the vehicle; and
generation of a selection signal, representing a selected operating mode of the transmission, depending on the release signal and an actuation signal from the at least one selector switch.

\* \* \* \* \*